US010518370B2

(12) United States Patent
Declerck

(10) Patent No.: US 10,518,370 B2
(45) Date of Patent: Dec. 31, 2019

(54) STAND FOR MULTIPLE STUD TENSIONING MACHINE

(71) Applicant: Aktiebolaget SKF, Gothenburg (SE)

(72) Inventor: Didier Declerck, Acheres (FR)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 15/838,467

(22) Filed: Dec. 12, 2017

(65) Prior Publication Data

US 2018/0169805 A1 Jun. 21, 2018

(30) Foreign Application Priority Data

Dec. 19, 2016 (DE) .................. 10 2016 225 363

(51) Int. Cl.
*B23P 19/06* (2006.01)
*B23P 19/10* (2006.01)
*G21C 13/024* (2006.01)

(52) U.S. Cl.
CPC .......... *B23P 19/064* (2013.01); *B23P 19/067* (2013.01); *B23P 19/107* (2013.01); *G21C 13/024* (2013.01)

(58) Field of Classification Search
CPC ..... B23P 19/064; B23P 19/067; B23P 19/107; B25B 29/02; G21C 19/32; G21C 19/02; G21C 13/073; G21C 13/024
USPC .......... 248/146, 669; 81/57.38, 57.39, 53.2; 411/4.5, 432, 918; 376/260, 263, 287, 376/262, 463; 166/134, 123, 63
See application file for complete search history.

(56) References Cited

U.S. PATENT DOCUMENTS

| 3,358,951 | A | * | 12/1967 | Carter | A47B 37/02 248/188.7 |
|---|---|---|---|---|---|
| 3,429,179 | A | * | 2/1969 | Fischer | G01L 5/0042 73/761 |
| 4,830,814 | A | * | 5/1989 | Altman | G21C 11/00 376/263 |
| 5,249,208 | A | * | 9/1993 | Ruzga | B23P 19/067 376/260 |
| 5,999,584 | A | * | 12/1999 | Adams | G21C 19/207 376/260 |
| 9,016,991 | B2 | * | 4/2015 | Twerdochlib | H02K 1/16 411/14 |
| 2006/0034414 | A1 | * | 2/2006 | Baliga | G21C 13/073 376/287 |
| 2006/0180314 | A1 | * | 8/2006 | Williams | E21B 19/006 166/355 |

(Continued)

FOREIGN PATENT DOCUMENTS

WO 2011120589 A1 10/2011

OTHER PUBLICATIONS

Article "SKF serre rapido des boulons XXXL!" from Magazine—J'automatise N°87 Mars-Avril 2013 p. 62.

(Continued)

*Primary Examiner* — Muhammad Ijaz
(74) *Attorney, Agent, or Firm* — Garcia-Zamor Intellectual Property Law, LLC; Ruy Garcia-Zamor; Bryan Peckjian

(57) ABSTRACT

A stand for hosting a Multiple Stud Tensioning Machine (MSTM) for tensioning working studs, the stand comprising a first assembly designed to lie on a floor, and a second assembly designed to receive the MSTM and movable in translation with respect to the first assembly thanks to a translation system.

15 Claims, 13 Drawing Sheets

(56) References Cited

U.S. PATENT DOCUMENTS

| | | | | |
|---|---|---|---|---|
| 2010/0246742 A1* | 9/2010 | Bloomquist | ........... | G21C 3/334 |
| | | | | 376/261 |
| 2012/0090864 A1* | 4/2012 | Junkers | ................... | B25B 21/00 |
| | | | | 173/218 |
| 2013/0195238 A1* | 8/2013 | Ohmori | .................. | G21C 19/00 |
| | | | | 376/260 |
| 2013/0199341 A1* | 8/2013 | Imi | ...................... | B23P 19/067 |
| | | | | 81/57 |
| 2013/0287160 A1* | 10/2013 | Shargots | ................. | G21C 7/12 |
| | | | | 376/260 |

OTHER PUBLICATIONS

Article "SKF cap sur l'excellence" from Info Mag Saint-Cyr-sur-Loire—janv/fév/mar/avr.2016 pp. 4 to 9.
Article "SKF livre la plus grande machine au monde" from magazine Fluides&Transmissions-Serrage Avril 2013 pp. 34 and 35.

* cited by examiner

STAND FOR MULTIPLE STUD TENSIONING MACHINE

CROSS-REFERENCE TO RELATED APPLICATION

This application claims priority to German patent application no. 102016225363.8 filed on Dec. 19, 2016, the contents of which are fully incorporated herein by reference.

FIELD OF THE PRESENT INVENTION

The invention concerns a stand for a Multiple Stud Tensioning Machine.

BACKGROUND

Large mechanical assemblies must often be maintained by several threaded rods or studs. A Multiple Stud Tensioning Machine (from now on mentioned by its acronym MSTM) is then used to position, screw and unscrew as well as pre-tension a plurality of threaded studs. Examples are the attachment of parts of wind turbines or of the protecting cover of nuclear power reactor shells. A number of threaded studs are usually arranged in a circular row for attachment of such kind of large mechanical assemblies.

In order to facilitate the attachment operations, for example of the protecting cover to a nuclear reactor shell of a power station, a supporting ring assembly is provided, said assembly being moved from above on the cylindrical cover installed on the nuclear power shell. The complete set of attachment studs is supported by the supporting ring which is also provided with all necessary components for screwing and unscrewing the studs as well as tensioning them in a longitudinal direction before tightening the corresponding reaction nuts. In order to fulfill those tasks, the supporting ring is usually equipped with at least one and preferably two robot units capable of being moved along the periphery of the supporting ring for screwing or unscrewing the working studs and the reaction nuts two by two within the nuclear power shell. The longitudinal traction force for pre-stressing each individual stud before tightening is produced by a plurality of hydraulic stud tensioners, each of which is mounted on the head of a respective stud. Such a multiple stud tensioning machine is known from WO 2011/120589A1.

Since such a MSTM is sometimes used once a year or even less, and for only a few hours, it is key to ensure a proper functioning of the machine before it is used to screw or unscrew the studs.

Further, some maintenance operations of the power station require the inspection and cleaning of the working studs, during an outage operation. Given that the weight of a stud can sometimes reach a few hundred kilograms, the sole manipulation of the studs before and during their inspection and cleaning today takes time and requires the usage of additional mechanical parts.

Consequently, there is room for improvement.

BRIEF SUMMARY OF THE PRESENT INVENTION

The aim of the invention is to provide a stand for a Multiple Stud Tensioning Machine (MSTM) for tensioning working studs.

To this end, the stand comprises a first assembly designed to lie on a floor, and a second assembly designed to receive the MSTM and movable in translation with respect to the first assembly by employing a translation system.

The present invention enables the MSTM to be parked safely and at a certain height from the floor, which be useful in order for instance to inspect the machine or do some maintenance operations on the machine.

According to further aspects of the invention which are advantageous but not compulsory, such a stand may incorporate one or several of the following features:

The translation system is installed on a base plate of the first assembly and comprises a plurality of nut-screw systems which are coupled mechanically and in a synchronized manner with one another by employing a synchronization gearbox which is driven by a first driving component such as an electric motor.

The stand comprises guiding arrangement for guiding the translation of the second assembly with respect to the first assembly.

The stand is centered on a central vertical axis and it comprises a slewing bearing comprising a non-rotatable ring, a rotatable ring, and rolling bodies interposed therebetween, the rings being centered on the central axis.

The rotatable ring of the slewing bearing comprises an annular gear which engages with a second driving component, such as an electric motor, and in that the non-rotatable ring of the slewing bearing is attached to the base plate of the first assembly of the stand.

Each nut-screw system further comprises a safety load cell for stopping the motion of the second assembly in case of excessive load on the nut-screw system measured by the safety load cell.

The stand comprises a plurality of first, second and third baskets for receiving the working studs from the MSTM or for receiving dummy studs used for testing the MSTM when placed on the stand.

The dummy studs are tensioning test studs used for testing a tensioning function of the MSTM.

The tensioning test studs are, when not used for testing the tensioning function of the MSTM, stored on a support platform of the second assembly.

The first baskets and the third baskets are fixed on the rotatable ring of the slewing bearing.

The dummy studs are screwing test studs used for testing a screwing/unscrewing function of the MSTM.

The screwing test studs are, when not used for testing the screwing/unscrewing function of the MSTM, stored on the second baskets.

Each second basket comprises a movable support which can translate with respect to a fixed support attached to the base plate of the stand so as to be able to move the second basket radially towards the central axis or away from it, between a radially inner position and a radially outer position.

The stand comprises an electric cabinet comprising command and control system, and electrical power source, for the first driving component and the second driving component, for operating the stand automatically and/or manually.

The tensioning and screwing/unscrewing functions of the MSTM can be tested remotely before the MSTM is used for the tensioning of the working studs.

Also, thanks to the invention, the working studs can be transferred to the stand for inspection, maintenance and cleaning.

BRIEF DESCRIPTION OF THE DRAWINGS

The invention will now be explained in correspondence with the annexed figures, and as an illustrative example, without restricting the object of the invention. In the annexed figures.

DETAILED DESCRIPTION OF THE PRESENT INVENTION

Figure 1:
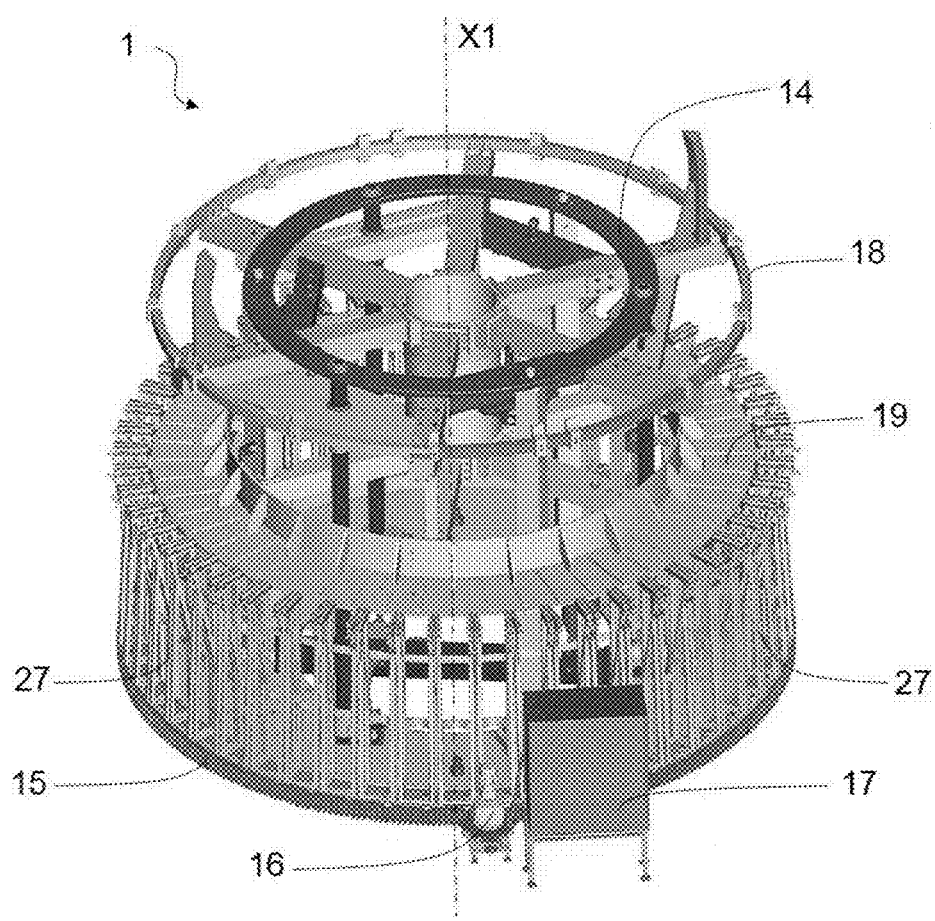
FIG. 1 is a perspective view of a preferred embodiment of a stand according to the invention, comprising a first assembly and a second assembly, the second assembly being in the upper position.
Figure 2:
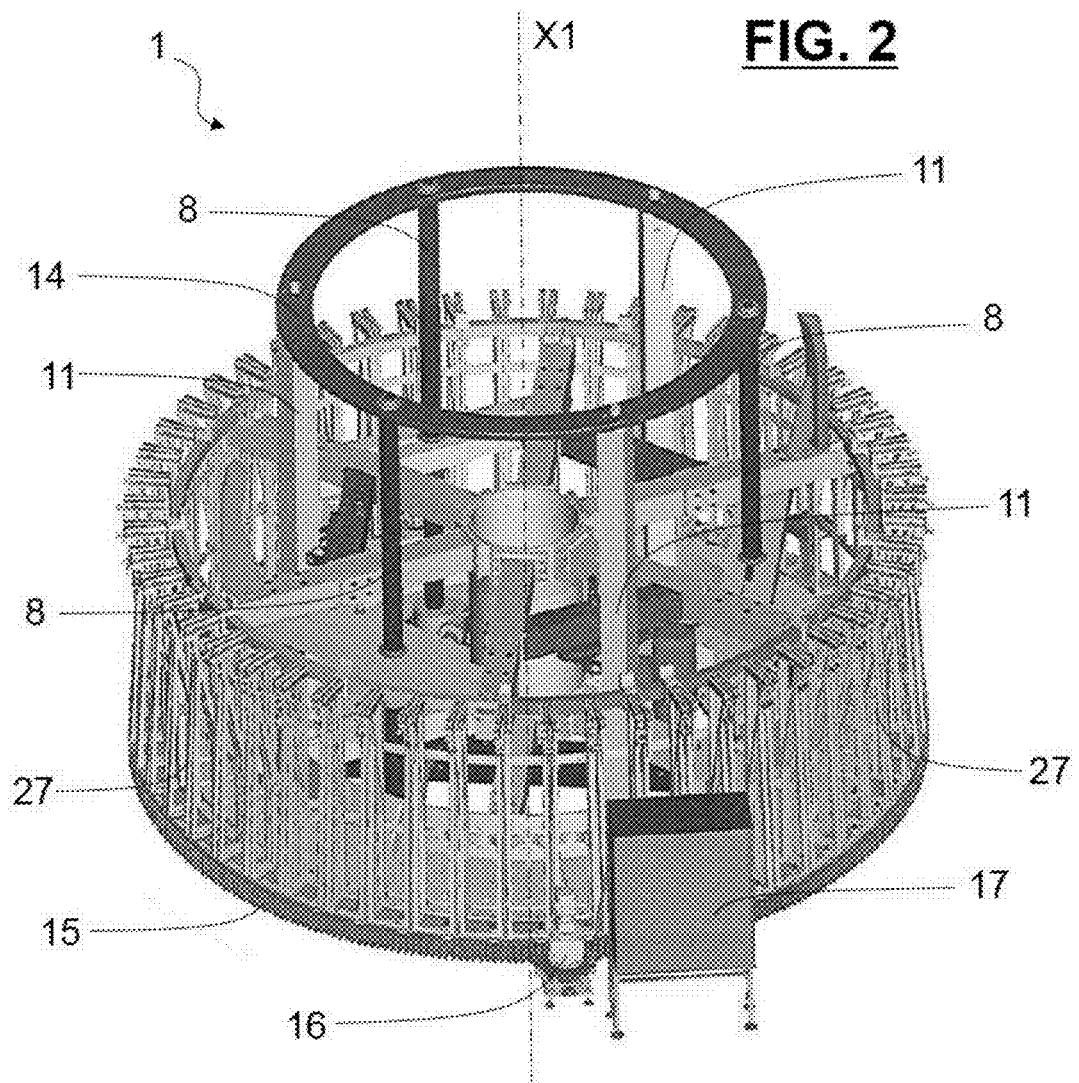
FIG. 2 is a perspective view of the stand of FIG. 1 where the second assembly is in the lower position.
Figure 3:
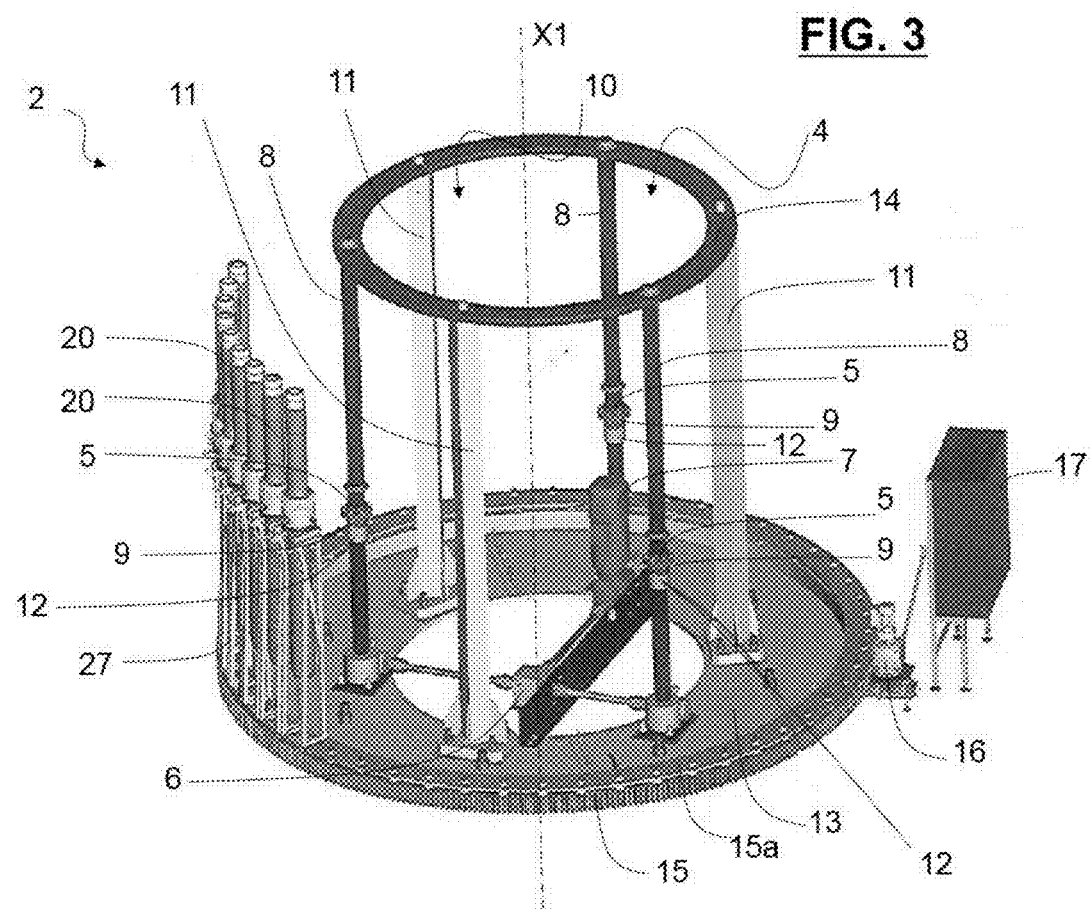
FIG. 3 is a perspective view of the first assembly of the stand of FIGS. 1 and 2.
Figure 4:
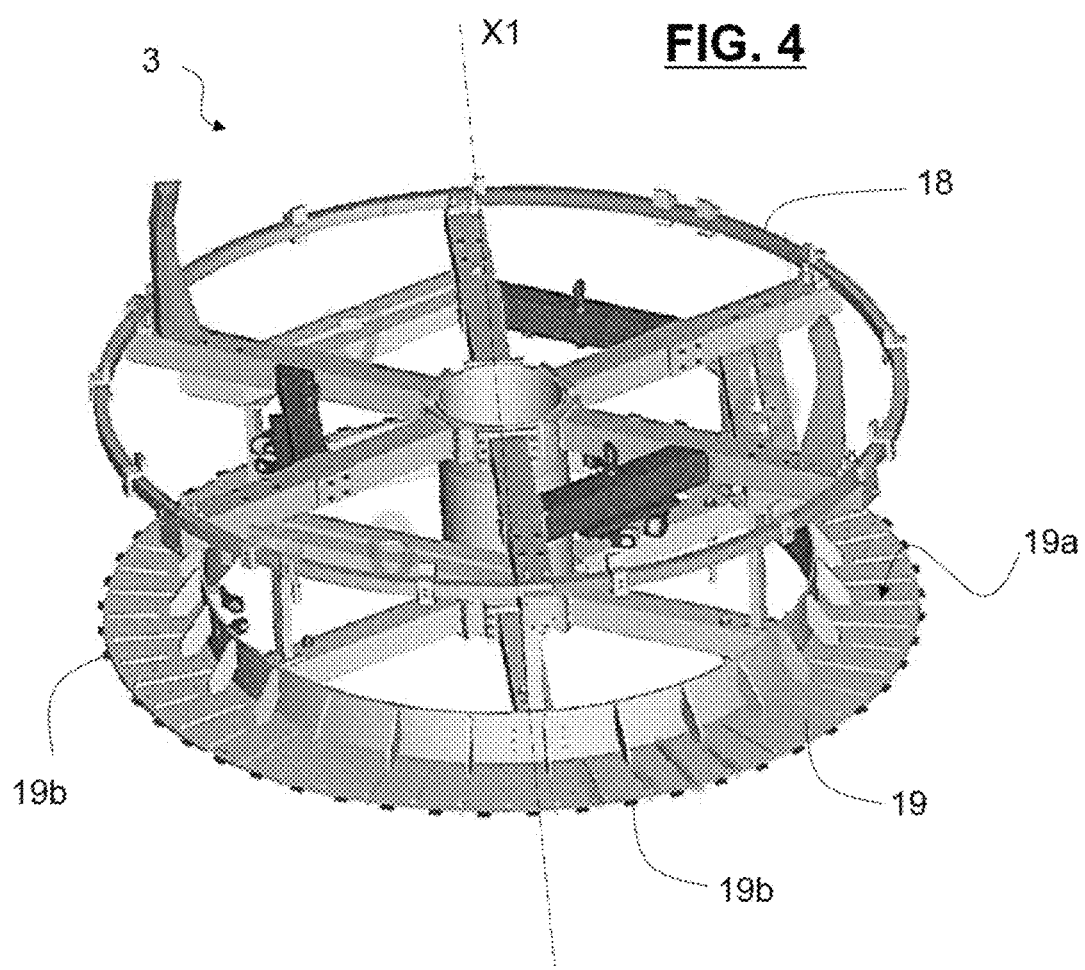
FIG. 4 is a perspective view of the second assembly of the stand of FIGS. 1 and 2.

FIGS. 1 and 2 show a stand 1 centered on a central axis X1.

A first purpose of the stand 1 is to receive a Multiple Stud Tensioning Machine (MSTM) M when the latter is not in used for the tensioning of studs during e.g. the attachment of parts of wind turbines or of the protecting cover of nuclear power reactor shells. Thanks to the stand 1, the MSTM M can be parked safely and at a certain height from the floor, which be useful in order for instance to inspect the machine or do some maintenance operations on it from underneath.

The stand 1 comprises a first assembly 2 and a second assembly 3. The first assembly 2 is designed to lie on a floor. The second assembly 3 is designed to receive the MSTM M. The second assembly 3 is movable in translation with respect to the first assembly 2 thanks to a translation system 4. The translation is vertical, that is to say, in correct use of the stand, in a direction perpendicular to the floor.

The translation system 4 comprises a plurality of nut-screw systems 5, which are coupled mechanically and in a synchronized manner with one another thanks to a synchronization gearbox 6. The synchronization gearbox 6 is driven by a first diving component 7 such as an electric motor. Each nut-screw system 5 comprises a screw 8 and a nut 9. Each nut 9 is fixedly attached to the second assembly 3 of the stand 1, so that upon synchronized rotation of the screws 8, the second assembly 3 of the stand 1 translates with respect to the first assembly 2 of the stand 1, either upwardly or downwardly with respect to the floor.

The first assembly 2 also comprises guiding arrangement 10 for guiding the translation of the second assembly 3. The guiding arrangement 10 comprises a plurality of guiding rails 11 and rollers (not represented).

Each nut-screw system 5 further comprises a safety load cell 12 for stopping the motion of the second assembly 3 in case of excessive load on the nut-screw system 5 measured by the safety load cell 12.

The first assembly 2 further comprises a base plate 13 which receives the synchronization gearbox 6, the first driving component 7 and the guiding rails 11. In normal operation of the stand 1, the base plate 13 lays on the floor.

The first assembly 2 also comprises an upper ring 14 which connects mechanically the guiding rails 11 and the screws 8, in a rigid manner so as to ensure their vertical positioning when the stand 1 lies on a horizontal floor.

In the illustrated embodiment of the invention, there are three screws 8, three associated nuts 9, three associated safety load cells 12, and three guiding rails 11, which is a minimum in order to guaranty a sufficiently robust mechanical assembly. In another embodiment of the invention, the translation system 4 comprises at least four screws 8, four associated nuts 9 and 4 guiding rails 11.

The stand 1 also comprises a slewing bearing 15 centered around the central axis X1. The slewing bearing 15 comprises a rotatable ring 15a, a non-rotatable ring 15b, and rolling bodies interposed therebetween. The rotatable ring 15a comprises an annular gear which engages with a second driving component 16, such as an electric motor, in order to rotate the rotatable ring 15a around the central axis X1. The non-rotatable ring 15b is attached to the base plate 13 of the first assembly 2 of the stand 1.

The stand 1 further comprises an electric cabinet 17 comprising a command and control system, comprising a PLC, and electrical power source for the first driving component 7 and the second driving component 16. Thanks to the electric cabinet 17, the stand 1 can be operated automatically and/or manually.

The second assembly 3 of the stand 1 comprises a main ring support 18 for hosting the MSTM M and a support platform 19. The main ring support 18 and the support platform 19 are, in normal operation of the stand 1, perpendicular to the translation system 4 and the guiding arrangement 10, that is to say parallel to the base plate 13, that is to say horizontal with respect to the floor.

Figure 5:
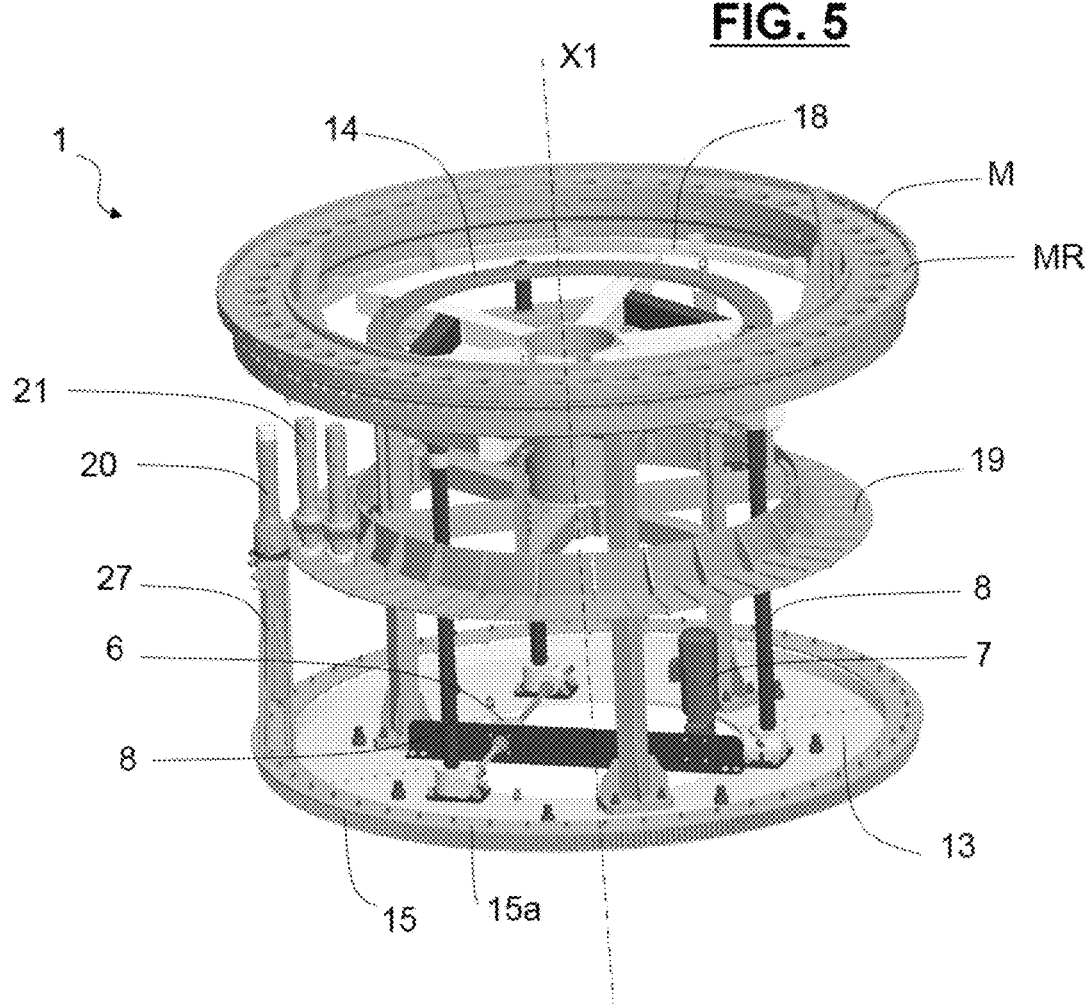
FIG. 5 is a perspective view of the stand of FIGS. 1 and 2, with the second assembly in the upper position and receiving the MSTM.

On FIG. 5, which illustrates the presence of the MSTM M installed on the main ring support 18 of the stand 1, the MSTM M is schematically represented by its main ring MR, the other elements of the MSTM M being not represented for simplification purpose. The main ring MR comprises a plurality of holes for accommodating and supporting the studs.

A second purpose of the stand is to test the proper functioning of the MSTM M. In particular, two functions of the MSTM M are critical. The first critical function is the tensioning of working studs 20, and the second critical function is the screwing/unscrewing of the working studs 20. By working studs it is meant the studs used in the application for which the MSTM is to be used, such as for the attachment of parts of wind turbines or of the protecting cover of nuclear power reactor shells.

The frequency usage of a MSTM M is rather low, sometimes less than once in a year, and for only a few hours, and such a complex and expensive machine is designed to last decades. It is essential that on the day when the MSTM M needs to operate, it operates reliably in order to prevent any unnecessary and costly down time.

To this end, a plurality of dummy studs are used for testing purpose. Advantageously, these dummy studs, or test studs are stored inside or on the stand 1. The test studs are of two different types. The first type is called tensioning test stud 21, for testing the tensioning function of the MSTM M. The second type is called screwing test stud 22 for testing the screwing/unscrewing function of the MSTM M.

We will now describe a tensioning test stud 21 and the method to test the tensioning function of the MSTM M thanks to a plurality of such tensioning test studs 21, as illustrated on the FIGS. 6 to 9.

When not in use, the tensioning test studs 21 are stored vertically inside the stand 1, on the support platform 19, as visible on FIG. 5.

The tensioning test stud 21 comprises a body 23 of cylindrical shape attached to a base support 24 by any known appropriate components such as screws. The base support 24 comprises rollers 25 and a prehension element 26 such as a handle. By acting on the prehension element 26, an operator can grab and move the tensioning test stud 21. As long as the tensioning test stud 21 is in contact with the support platform 19, the tensioning test stud 21, when moved, rolls on the rollers 25.

The stand 1 comprises a plurality of first baskets 27 for receiving the tensioning test studs 21. The first baskets 27 are attached perpendicularly to the rotatable ring of the slewing bearing 15. The first baskets 27 are located on a circle centered on central axis X1 and the diameter of which is greater than an external diameter of the support platform 19. The first baskets 27 are located radially around the support platform 19 with respect to central axis X1. Each first basket 27 comprises, on its upper end, a rail system 28 for engaging with a protrusion 29 of the base support 24 of one tensioning test stud 21, and a support portion 30 with a rolling surface 30a for receiving the rollers 25 of the tensioning test stud 21. As long as the tensioning test stud 21 is in contact with the first basket 27, the tensioning test stud 21 travels on the rail system 28. Advantageously, in order to minimize friction, the rail system 28 is of the ball bearing type.

Figure 9:
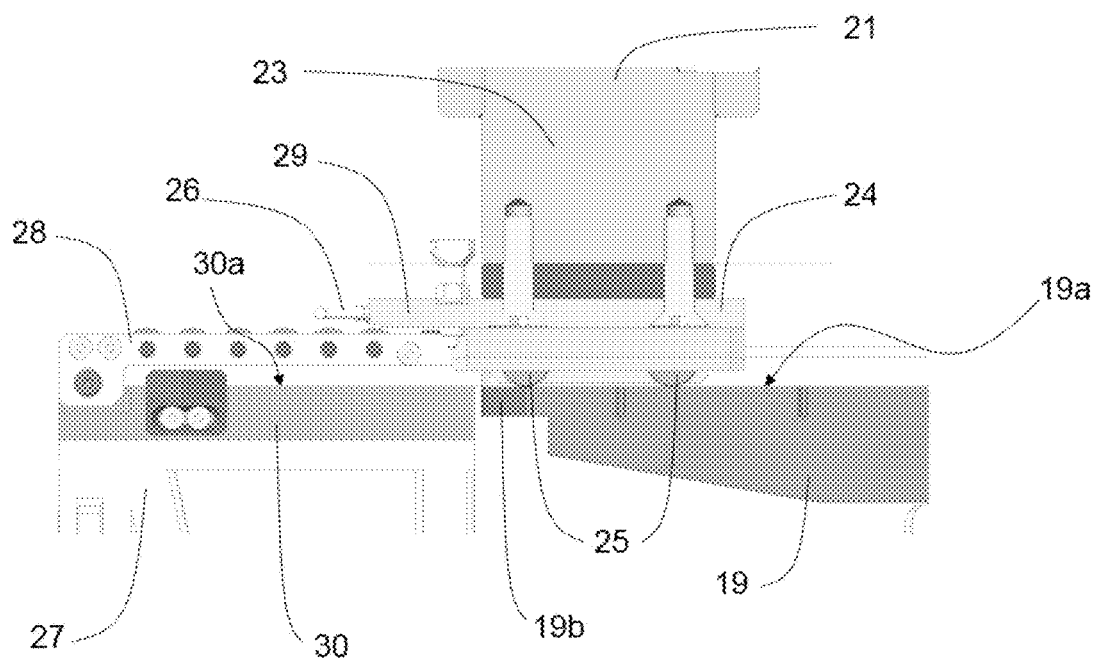
FIG. 9 is detailed view of FIG. 8.

Furthermore, in order to ensure a smooth passage of a tensioning test stud 21 from the support platform 19 to a first basket 27, and to make it possible for an operator to manually transfer the tensioning test stud 21, the protrusion 29 of the base support 24 already engages with the rail system 28 of the first basket 27 while the rollers 25 still roll on a rolling surface 19a of the support platform 19, as visible on FIG. 9.

Also, it is very important, for easiness and safely purpose, that during the transfer of the tensioning test stud 21 from the support platform 19 to the first basket 27 and vice-versa, the rolling surface 19a of the support platform 19 is maintained at the same distance from the rail system 28 This is achieved thanks to an aligning block 19b which is fastened onto an edge of the support platform 19. In case the rolling surface 19a of the support platform 19 is a bit higher than the rolling surface 30a of the support portion 30, the aligning block 19b lifts up and rotates the rail system 28.

Hence, the perfect alignment of the support platform 19 and the rail system 28 is made thanks to the aligning block 19b, provided that the second assembly 3 is at the sufficient height with respect with the first basket 26.

In fact, in order to take into account the change of load on the support platform 19 and therefore the change of deflection of the support platform 19, due to the transfer of the tensioning test studs from the support platform 19 to the first baskets 26, the second assembly 3 is positioned, before the transfer, a few millimeters higher than the first basket 26.

The method to test the tensioning function of the MSTM M, once installed on the stand 1, comprises the following successive steps.

To start with, the second assembly 3 of the stand 1 is moved to its upper position, with the tensioning test studs 21 located on the support platform 19 of the second assembly 3.

Then, each tensioning test stud 21 is transferred from the support platform 19 to a first basket 27 as described earlier.

Figure 6:
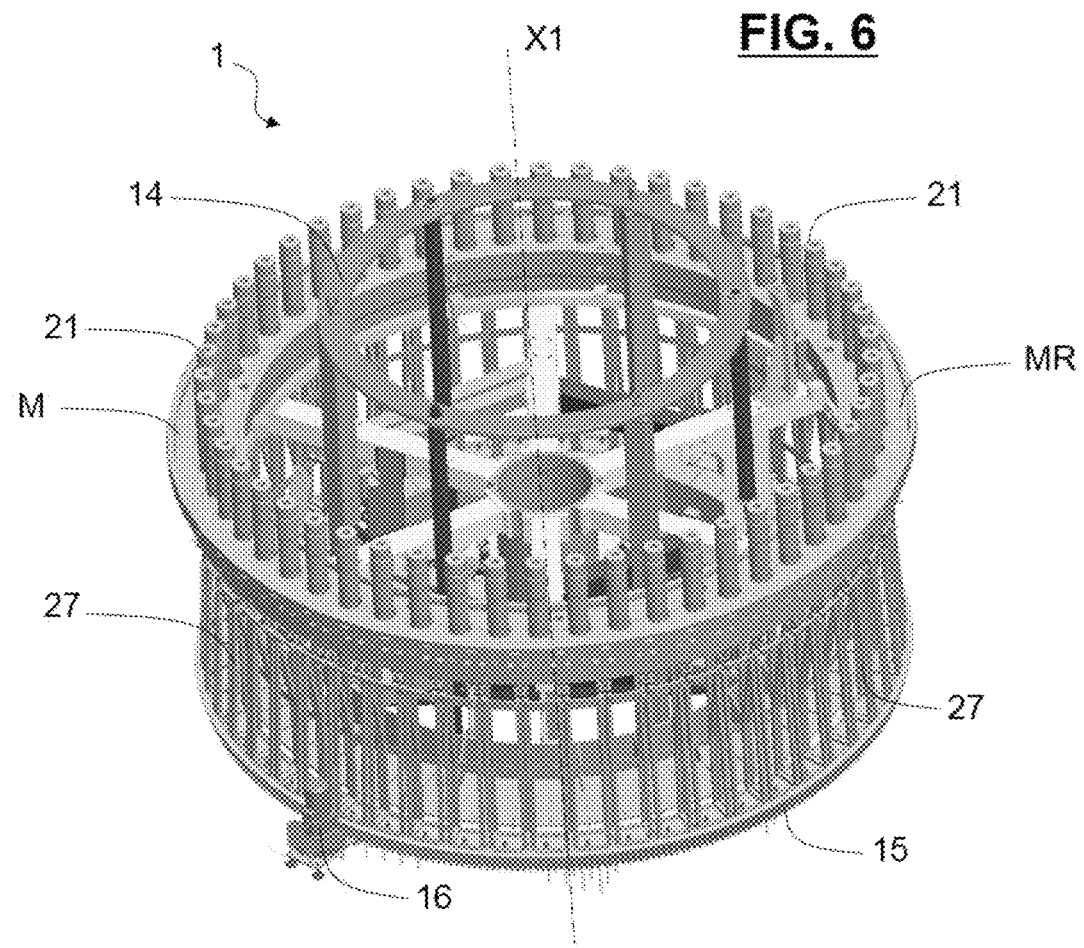
FIG. 6 is a perspective view of the stand of FIGS. 1 and 2, with the second assembly in the lower position and receiving the MSTM.
Figure 7:
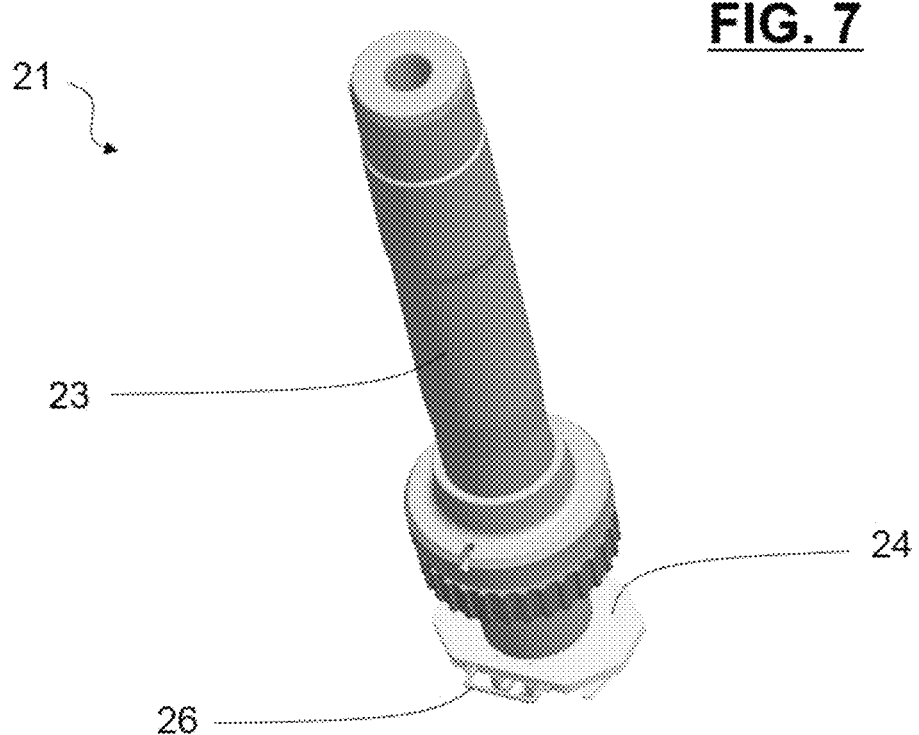
FIG. 7 is a perspective view of a tensioning test stud according to the invention.
Figure 8:
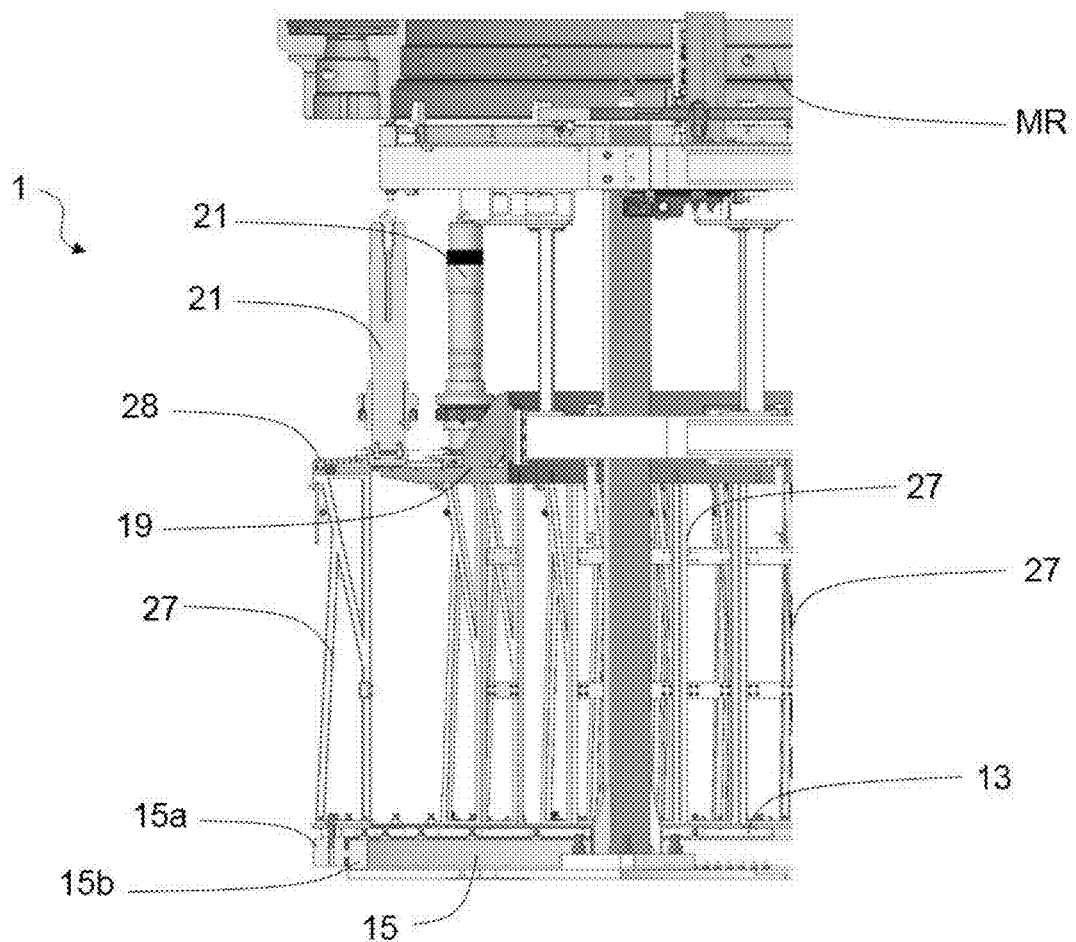
FIG. 8 is a partial view of the stand according to the invention showing how a tensioning test stud is transferred from a support plate to a first basket.

Then, once all the tensioning test studs 21 have been transferred to the first baskets 27, the second assembly 3 of the stand is moved down to its lower position. During this movement, the tensioning test studs 21 are accommodated in the holes of the main ring MR of the MSTM M. FIG. 6 illustrates the moment when the second assembly 3 has reached its lower position.

The MSTM M is then operated so as to apply a tension on the tensioning test studs 21 in order to simulate a tensioning of the working studs 20.

Once the tensioning test of the MSTM M is finished, the second assembly 3 of the stand 1 is moved up until its upper position, and the tensioning test studs 21 can be then be moved back from the first baskets 27 to the support platform 19 of the second assembly 3.

We will now describe a screwing test stud 22 and the method to test the screwing/unscrewing function of the MSTM M thanks to a plurality of such screwing test studs 22, as illustrated by the FIGS. 10 to 13.

Each screwing test stud 22 comprises a body 31 of general cylindrical shape with a threaded end portion (not visible). A test nut 32 is installed onto a threaded portion of the screwing test stud 22. The test nut comprises a flat surface.

The screwing test stud 22 is identical at least geometrically to the working stud 20, and the test nut 32 is identical at least geometrically to a reaction nut used in a real application together with a working stud, such as the attachment of the protecting cover to a nuclear reactor shell of a power station. Advantageously, the screwing test stud 22 is identical to the working stud 20, and the test nut 32 is identical to the reaction nut.

The stand 1 comprises a plurality of second baskets 33 for receiving the screwing test studs 22. Each second basket 33 comprises two arms 34 fitted with ball bearings for bearing one screwing test stud 22. The ball bearings are intended to contact only the flat surface of the test nut 32 screwed onto a screwing test stud 22. Each second basket further comprises a prehension element 35 such as a handle to easily grasp the second basket 33. Each second basket 33 also comprises a movable support 36 which can translate with respect to a fixed support 37 attached to the base plate 13 of the stand 1 so as to be able to move the second basket 33 radially towards the central axis X1 or away from it, between a radially inner position and a radially outer position.

Figure 10:
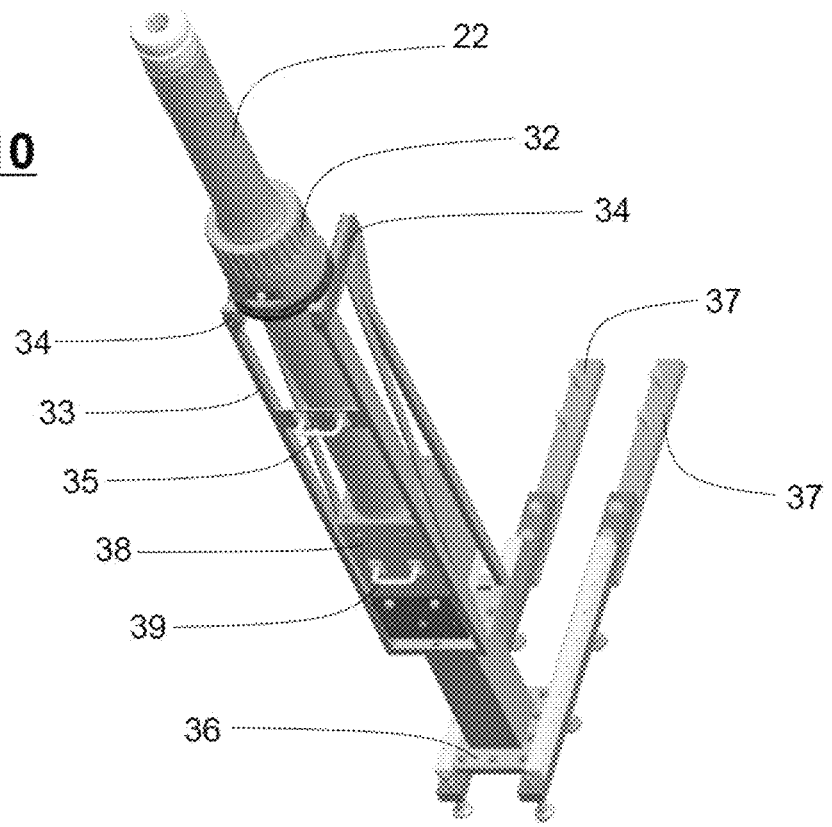
FIG. 10 is a perspective view of a screwing test stud according to the invention installed on a second basket.
Figure 11:
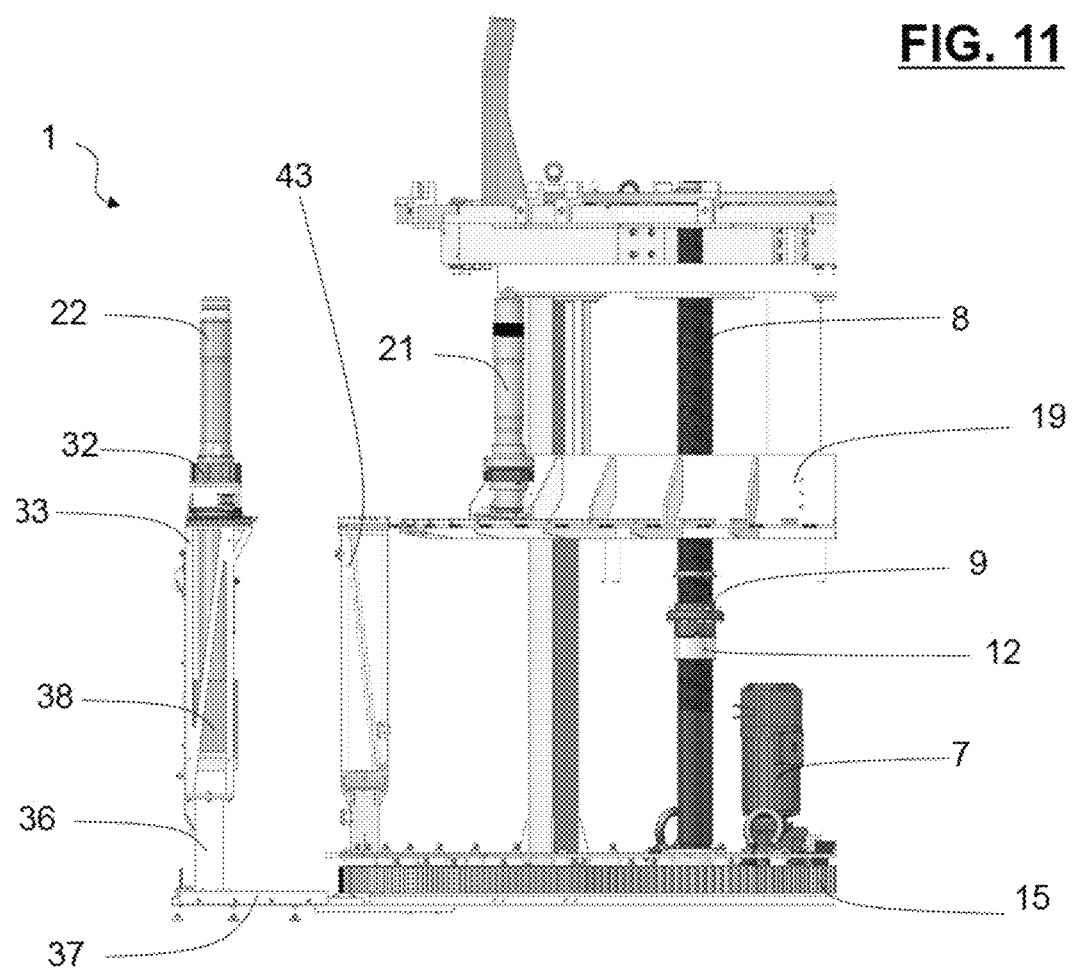
FIG. 11 is a partial view of the stand according to the invention showing the positioning of the second basket in a radially outer position.
Figure 12:
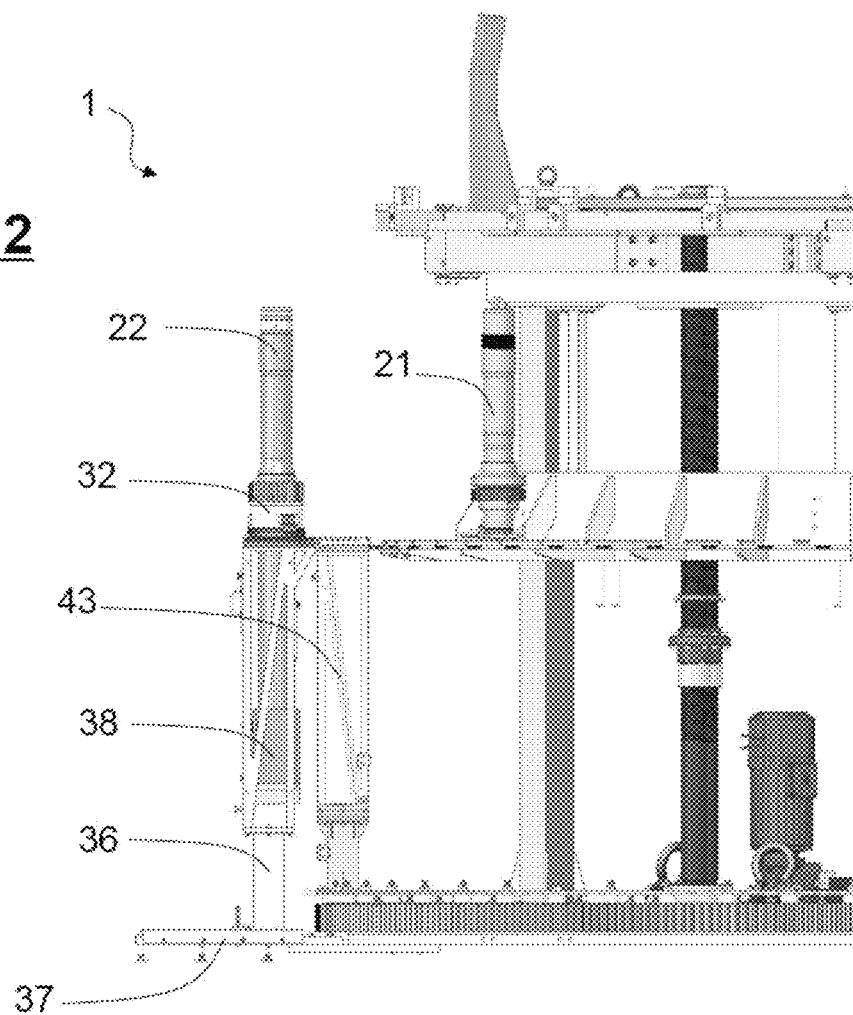
FIG. 12 is a partial view of the stand according to the invention showing the positioning of the second basket in a radially inner position.

When a screwing test stud 22 is not in use, it is stored in one of the second baskets 33 which is in its radially outer position, radially away from the slewing bearing 15 with respect to central axis X1, as illustrated on FIG. 10. Moreover, its threaded end portion is engaged into a screwing box 38 which comprises a mating threaded portion (not visible either).

The screwing box 38 also comprises a prehension element 39 such as a handle.

The screwing box comprises a lower surface 38a which is flat and which makes an angle $\alpha$ with respect to a direction Y1 which is perpendicular to the central axis X1. The function of the lower surface 38a will be explained later on.

Preferably, the angle α is comprised between 1° and 10°. In a preferred embodiment of the invention, the angle is approximately 3°.

On the screwing box 38 is attached a plate 40 thanks to a first screw 41. The plate bears a second screw 42, the function of which will be explained later on.

Thanks to the prehension element 35 on the second basket 33, and the prehension element 39 on the screwing box 38, an operator can, with his/her two hands easily move the second basket 33 as described earlier.

The stand 1 further comprises a plurality of third baskets 43 which have similarities with the first baskets 27.

The third baskets 27 comprise a leg 44 which is attached to the rotatable ring 15a of the slewing bearing 15. The third baskets 43 are located on the same circle centered on central axis X1 as the one where the first baskets 27 are located. Each third basket 43 comprises, on its upper end, a rail system 28 similar to the one of each first basket 27, for engaging with a protrusion 29 of the base support 24 of one tensioning test stud 21, and a support portion 30 with a rolling surface 30a, similar as the ones of each first basket 27, for receiving the rollers 25 of the tensioning test stud 21. As long as the tensioning test stud 21 is in contact with the third basket 43, the tensioning test stud 21 travels on the rail system 28. Advantageously, in order to minimize friction, the rail system 28 is of the ball bearing type.

The rail system 28 of the third basket 43 is also for engaging by contact the flat surface of the test nut 32 screwed onto a screwing test stud 22.

The third basket 43 further comprises a pad 45 with an upper surface 45a which is flat and which makes the angle α with respect to the direction Y1 (which is perpendicular to the central axis X1). The function of the upper surface 45a will be explained later on. On the upper surface 45a of the pad 45 is fixedly attached a mechanical stop 46.

The method to test the screwing/unscrewing function of the MSTM M, once installed on the stand 1, comprises the following successive steps.

To start with, the second assembly 3 of the stand 1 is moved to its upper position. Then, the slewing bearing 15 is rotated until each second basket 33 radially faces a third basket 43.

Then, each second basket 33, holding thanks to a test nut 32 a screwing test stud 22 already screwed into a corresponding screwing box 38, is moved from its radially outer position towards its radially inner position. In this radially inner position, as illustrated on FIG. 12, the second basket 33 is in contact with a third basket 43, and the surface of the arms 34 in contact with the flat surface of the test nut 32 is aligned with the surface of the rail system 28 of the third basket intended to receive the flat surface of the test nut 32. The alignment of these two surfaces means that they are at the same height with respect to the floor. This alignment is very important in order to be able to transfer by hand the screwing test stud 22 and its test nut 32, the mass of which can be a few hundred kilograms, from the second basket 33 to the third basket 43.

Figure 13:
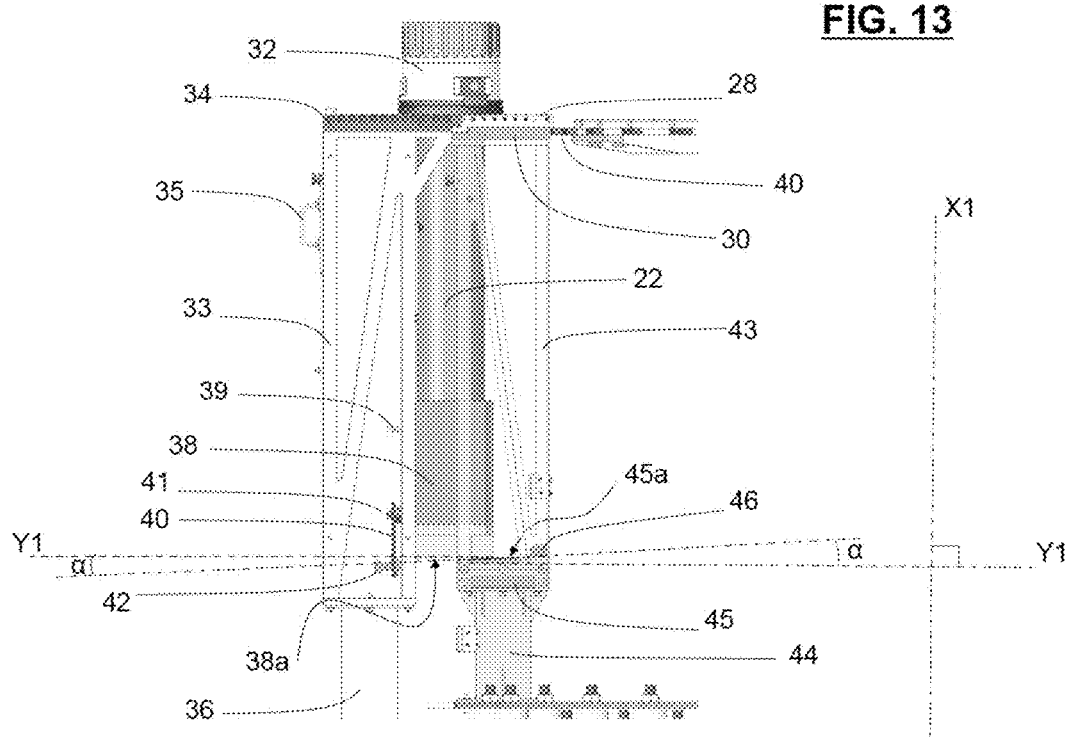
FIG. 13 is a detailed view showing how a screwing test stud is transferred from a second basket to a third basket.

Then, as visible on FIG. 13, the screwing test stud 22 with the test nut 32 installed on it is transferred by hand, from the second basket 33 to the third basket 43. More precisely, the screwing test stud 22 with the test nut 32 is transferred from the arms 34 of the second basket 33 to the rail system 28 of the third basket 43. During this transfer, the lower surface 38a of the screwing box 38 and the upper surface 45a of the pad 45, which are parallel because inclined, with respect to direction Y1, by the same angle α, come close to each other until they contact. The second screw 42 is then screwed into the pad 45 so that the lower surface 38a of the screwing box 38 slides on the upper surface 45a of the pad 45, with, as a consequence, the continuation of the transfer of the screwing test stud 22 and its associated test nut 32 from the second basket 33 to the third basket 43. This continues until the screwing box 38 comes in abutment with the mechanical stop 46 installed on the pad 45 of the third basket 43. In this position, the screwing test stud 22 and its associated test nut 32 are now installed on the third basket 43 only.

The inclination with respect to direction Y1 of the lower surface 38a of the screwing box 38 and the upper surfaces 45a of the pad 45 allows to compensate for an approximate positioning of the test nut 32 onto the screwing test stud 22.

Then, the second assembly 3 of the stand is moved down to its lower position. During this movement, the screwing test studs are accommodated in the holes of the main ring MR of the MSTM M. The MSTM M is then operated so as to first unscrew each screwing test stud 22 with respect to its corresponding screwing box 38, and then screw each screwing test stud 22 back into the screwing box 38, in order to simulate a screwing/unscrewing of the working studs 20.

A third purpose of the stand 1 is to temporarily store the working studs 20, for instance after they have been removed from their application thanks to the MSTM M, for e.g. cleaning, inspection or maintenance operations.

In a first step, the working studs 20 are transferred from the MSTM M to the first baskets 27 and third baskets 43 by moving the second assembly 3 of the stand 1 from its upper position down to its lower position.

In a second step, the second baskets 33, which have been emptied beforehand (the screwing test studs 22 have been removed), are moved from their radially outer position to their radially inner position. In this radially inner position, if necessary, the rotatable ring 15a of the slewing bearing 15 is rotated so as to align each second basket 33 with a first basket 27 or a third basket 43.

In a third step, the working studs 20 are transferred from the first baskets 27 and the third baskets 43 to the second baskets 33 which are subsequently moved from their radially inner position back to their radially outer position. The working studs 20 are then easily accessible for inspection and repair if needed. For their cleaning, a cleaning station (not represented) is installed in the vicinity of the stand, on its outer periphery, as close as possible to the second baskets.

In the illustrated embodiment of the invention, the stand 1 comprises fifty first baskets 27, fifty-two tensioning test studs 21, two second baskets 33, two third baskets 41 and two screwing test studs 22.

The numbers of first baskets 27, second baskets 33, tensioning test studs 21 and screwing test studs 22 is adaptable to the needs and depends on the MSTM M configuration. Advantageously, the number of first baskets 27 plus the number of third baskets 43 is equal to the number of tensioning test studs 21. Advantageously, the number of tensioning test studs 21 is equal to the number of working studs 20 to be simultaneously installed by the MSTM M.

Furthermore, the dimensions of the tensioning test studs 21 and the screwing test studs 22 can vary and are predetermined according to the dimensions of the working studs 20.

In addition, technical features of the different embodiments can be, in whole or part, combined with each other.

The present invention provides the following benefits:

The MSTM can be safely stored and accessible from underneath in order to do some inspection or maintenance operation.

The tensioning and screwing/unscrewing function of the MSTM can be tested by employing dummy studs.

The working studs can be transferred to the stand for inspection, maintenance and cleaning.

All the necessary testing equipment (tensioning test studs and screwing test studs) can be stored in the same area, on the stand, without taking additional area at the user's facilities.

NOMENCLATURE

| Ref. No. | Description |
| --- | --- |
| X1 | central axis |
| Y1 | direction |
| M | Multiple Stud Tensioning Machine |
| MR | main ring |
| α | angle |
| 1 | stand |
| 2 | first assembly |
| 3 | second assembly |
| 4 | translation system |
| 5 | nut-screw system |
| 6 | synchronization gearbox |
| 7 | first driving component |
| 8 | screw |
| 9 | nut |
| 10 | guiding arrangement |
| 11 | guiding rails |
| 12 | safety load cell |
| 13 | base plate |
| 14 | upper ring |
| 15 | slewing bearing |
| 15a | rotatable ring |
| 15b | non-rotatable ring |
| 16 | second driving component |
| 17 | electric cabinet |
| 18 | main ring support |
| 19 | support platform |
| 19a | rolling surface |
| 19b | aligning block |
| 20 | working stud |
| 21 | tensioning test stud |
| 22 | screwing test stud |
| 23 | body |
| 24 | base support |
| 25 | rollers |
| 26 | prehension element |
| 27 | first basket |
| 28 | rail system |
| 29 | protrusion |
| 30 | support portion |
| 30a | rolling surface |
| 31 | body |
| 32 | test nut |
| 33 | second basket |
| 34 | arm |
| 35 | prehension element |
| 36 | movable part |
| 37 | fixed support |
| 38 | screwing box |
| 38a | lower surface |
| 39 | prehension element |
| 40 | plate |
| 41 | first screw |
| 42 | second screw |
| 43 | third basket |
| 44 | leg |
| 45 | pad |
| 45a | upper surface |
| 46 | mechanical stop |

What is claimed is:

1. A stand for hosting a multiple stud tensioning machine for tensioning working studs, the stand comprising:
a first assembly designed to lie on a floor; and
a second assembly designed to receive the multiple stud tensioning machine and movable in translation with respect to the first assembly by way of a translation system, wherein
the translation system is installed on a base plate of the first assembly and comprises a plurality of nut-screw systems that are coupled mechanically and in a synchronized manner with one another using a synchronization gearbox, which is driven by a first driving component.

2. The stand according to claim 1, wherein the first driving component is an electric motor.

3. The stand according to claim 1, further comprising a guiding arrangement for guiding the translation of the second assembly with respect to the first assembly.

4. The stand according to claim 1, wherein the stand is centered on a central vertical axis and it comprises a slewing bearing comprising a non-rotatable ring, a rotatable ring, and rolling bodies interposed therebetween, the rings being centered on central axis.

5. The stand according to claim 4, wherein the rotatable ring further comprises an annular gear that engages with a second driving component, and
wherein the non-rotatable ring is attached to the base plate of the first assembly of the stand.

6. The stand according to claim 5, wherein the second driving component, is an electric motor.

7. The stand according to claim 1, wherein each nut-screw system further comprises a safety load cell for stopping the motion of the second assembly in case of excessive load on the nut-screw system measured by the safety load cell.

8. The stand according to claim 1, further comprising a plurality of first baskets;
a plurality of second baskets; and
a plurality of third baskets for one of:
(a) receiving the tensioning working studs from the multiple stud tensioning machine, or
(b) receiving dummy studs used for testing the multiple stud tensioning machine when placed on the stand.

9. The stand according to claim 8, wherein the dummy studs are tensioning test studs used for testing a tensioning function of the multiple stud tensioning machine.

10. The stand according to claim 8, wherein the plurality of first baskets and the plurality of third baskets are fixed on a rotatable ring of a slewing bearing.

11. The stand according to claim 9, wherein the tensioning test studs are stored on a support platform of the second assembly of the stand.

12. The stand according to claim 8, wherein the dummy studs are screwing test studs used for testing an at least one of a screwing function and an unscrewing function of the multiple stud tensioning machine.

13. The stand according to claim 12, wherein the screwing test studs are, when not used for testing the screwing/unscrewing function of the multiple stud tensioning machine, stored on the second baskets.

14. The stand according to claim 8, each second basket further comprising a movable support which can translate with respect to a fixed support attached to the base plate of the stand so as to be able to move the second basket radially towards the central axis or away from it, between a radially inner position and a radially outer position.

15. The stand according to claim 5, further comprising an electric cabinet comprising command and control system, and electrical power source, for the first driving component and the second driving component, for operating the stand in at least one of automatically and manually.

\* \* \* \* \*